United States Patent Office 3,297,686
Patented Jan. 10, 1967

3,297,686
4',5'-DIHYDROSPIRO[ESTR/ANDROST-4-ENE-17,2'(3'H)-FURAN]-3β-OLS AND ESTERS THEREOF
Edward A. Brown, Wilmette, Ill., assignor to G. D. Searle & Co., Chicago, Ill., a corporation of Delaware
No Drawing. Filed Oct. 19, 1964, Ser. No. 404,966
5 Claims. (Cl. 260—239.55)

This invention relates to 4',5'-dihydrospiro[estr/androst-4-ene-17,2'(3'H)-furan]-3β-ols, esters thereof, and processes whereby these products can be prepared. More particularly, this invention provides new, useful, and unobvious chemical compounds of the formula

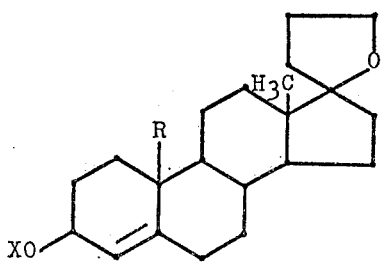

wherein X represents hydrogen or an alkanoyl radical and R represents hydrogen or the methyl radical.

Among the alkanoyl radicals represented by X, especially lower alkanoyl radicals are preferred, i.e., radicals of the formula

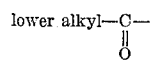

Those skilled in the art will recognize that lower alkyl radicals are monovalent, saturated, acyclic, straight- or branched-chain, hydrocarbon groupings typified by methyl, ethyl, propyl, isopropyl, butyl, isobutyl, sec-butyl, tert-butyl, pentyl, neopentyl, hexyl, isohexyl, heptyl, and the like of empirical formula —$C_nH_{2n+1}$ wherein $n$ represents a positive integer less than 8.

The compounds to which this invention relates are useful because of their valuable pharmacological properties. Thus, for example, they are estrogen antagonists, as also anti-protozoal agents especially effective against *Tetrahymena gelleii*.

Preparation of the subject compounds proceeds by reducing an appropriate ketone of the formula

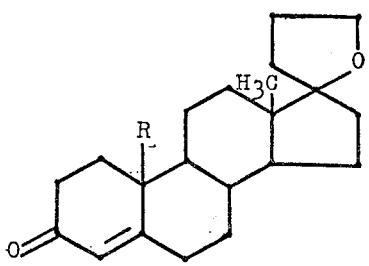

(wherein R is defined as before) with lithium aluminum tri-tert-butoxy hydride in cold tetrahydrofuran under nitrogen to give the corresponding 3β-ol, which, in turn, is esterified by prolonged contact with an appropriate alkanoic acid anhydride or halide in the presence of pyridine at room temperatures.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

*4',5' - dihydrospiro[estr - 4 - ene - 17,2'(3'H)furan]-3β-ol.*—To a suspension of 85 parts of lithium aluminum tri-tert-butoxy hydride in 710 parts of tetrahydrofuran at 5° under nitrogen is added, during 5 minutes with agitation, a solution of 85 parts of 4',5'-dihydrosipor[ester-4-ene-17,2'(3'R)-furan]-3-one (preparable by the procedure set forth in Belgian Patent Number 631,946) in 890 parts of tetrahydrofuran. Agitation at 5° is continued for 40 minutes after the addition is complete, whereupon the resultant mixture is allowed to warm to room temperature during one hour and then poured into a mixture of 200 parts of glacial acetic acid and 10,000 parts of water. The oil which separates congeals after 3 hours at 5°, at which point it is filtered off, washed with water, dried in air, and consecutively recrystallized from hexane and ethyl acetate to give 4',5'-dihydrospiro[estr-4-ene-17,2'(3'H)-furan]-3β-ol, melting at 130–135°. The product has the formula

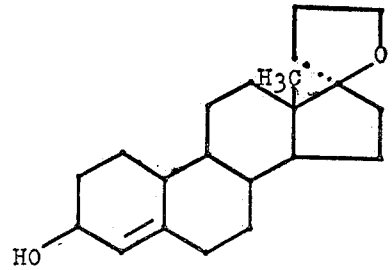

Example 2

*3β - acetoxy-4',5'-dihydrospiro[estr - 4-ene-17,2'(3'H)-furan].*—A solution of 33 parts of 4',5'-dihydrospiro[estr-4-ene-17,2'(3'H)-furan]-3β-ol in 350 parts of pyridine and 270 parts of acetic anhydride is allowed to stand at room temperatures for 19 hours, then mixed with 10,000 parts of ice water. The gummy precipitate thrown down solidifies when the mother liquor is decanted and replaced with water. The precipitate is collected on a filter, washed thereon with water, dried in air, and twice recrystallized from hexane to give 3β-acetoxy-4',5'-dihydropiro[ester-4-ene-17,2'(3'H)-furan], melting at 117–120°. The product has the formula

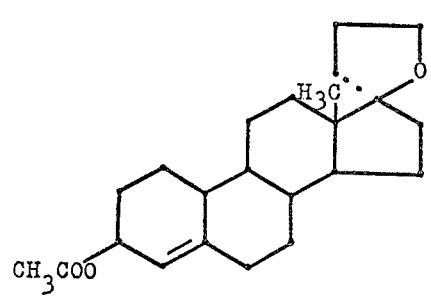

Example 3

4',5' - dihydrospiro[androst-4-ene-17,2'(3'H) - furan]-3β-ol.—To a suspension of 55 parts of lithium aluminum tri-tert-butoxy hydride in 425 parts of tetrahydrofuran at 5° under nitrogen is added, during 10 minutes with agitation, a solution of approximately 66 parts of 4',5'-dihydrospiro[androst-4-ene-17,2'(3'H) - furan]-3-one (preparable by the procedure set forth in Belgian Patent Number 631,946) in 425 parts of tetrahydrofuran. Agitation at 5° is continued for one hour after the addition is complete, whereupon the resultant solution is allowed to warm to room temperature during 2 hours and then poured into a mixture of 200 parts of glacial acetic acid and 8000 parts of water. The precipitate which forms is filtered off, washed with water, and twice recrystallized—first from a mixture of benzene and hexane and then from benzene alone—to give 4',5', - dihydrospiro[androst - 4-ene-17,2'(3'H)-furan]-3β-ol, melting at 166–170°. The product has the formula

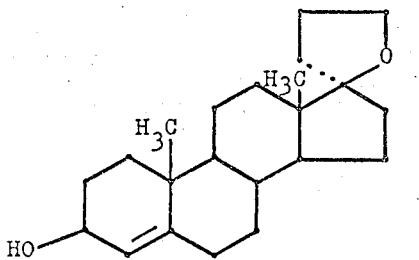

Example 4

3-β-acetoxy - 4',5' - dihydrospiro[androst - 4-ene-17,2'(3'H)-furan].—A solution of 75 parts of 4',5'-dihydrospiro[androst-4-ene-17,2'(3'H)-furan]-3β-ol in 800 parts of pyridine and 600 parts of acetic anhydride is maintained at room temperatures for 20 hours, then poured into 10,000 parts of cold (5°) water. The precipitate which forms is collected on a filter, washed thereon with water, dried in air, and recrystallized from hexane to give 3β-acetoxy-4',5' - dihydrospiro[androst-4-ene-17,2'(3'H)-furan], melting at approximately 102–103°. The product has the formula

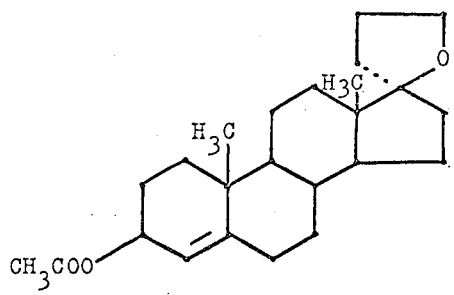

What is claimed is:
1. A compound of the formula

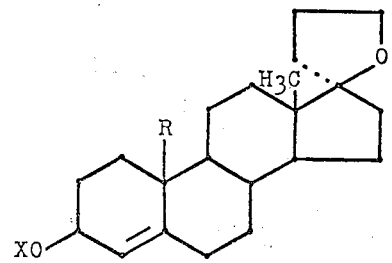

wherein X is selected from the group consisting of hydrogen and lower alkanoyl radicals and R is selected from the group consisting of hydrogen and the methyl radical.

2. 4',5'-dihydroxyspiro[estr-4-ene-17,2'(3'H) - furan]-3β-ol.

3. 3β - acetoxy - 4',5' - dihydrospiro[estr - 4 - ene-17,2'(3'H)-furan].

4. 4',5' - dihydrospiro[androst - 4 - ene - 17,2'(3'H)-furan]-3β-ol.

5. 3β-acetoxy - 4',5'-dihydrospiro[androst - 4-ene-17,2'(3'H)-furan].

No references cited.

LEWIS GOTTS, *Primary Examiner.*

HENRY A. FRENCH, *Assistant Examiner.*